United States Patent
Yoo et al.

(10) Patent No.: US 10,490,811 B2
(45) Date of Patent: Nov. 26, 2019

(54) NEGATIVE ELECTRODE ACTIVE MATERIAL FOR LITHIUM SECONDARY BATTERY, AND LITHIUM SECONDARY BATTERY INCLUDING NEGATIVE ELECTRODE INCLUDING THE NEGATIVE ELECTRODE ACTIVE MATERIAL

(71) Applicant: SAMSUNG SDI CO., LTD., Yongin-si, Gyeonggi-do (KR)

(72) Inventors: Hana Yoo, Yongin-si (KR); Deokhyun Kim, Yongin-si (KR); Jaehyuk Kim, Yongin-si (KR); Soonsung Suh, Yongin-si (KR); Jaemyung Kim, Yongin-si (KR); Heesang Jeon, Yongin-si (KR); Yungu Cho, Yongin-si (KR); Jongsoo Cho, Yongin-si (KR)

(73) Assignees: Samsung SDI Co., Ltd., Yongin-Si, Gyeonggi-do (KR); MK Electron Co., Ltd., Yongin-Si, Gyeonggi-do (KR)

( * ) Notice: Subject to any disclaimer, the term of this patent is extended or adjusted under 35 U.S.C. 154(b) by 119 days.

(21) Appl. No.: 15/712,548

(22) Filed: Sep. 22, 2017

(65) Prior Publication Data
US 2018/0090756 A1    Mar. 29, 2018

(30) Foreign Application Priority Data

Sep. 23, 2016  (KR) .................. 10-2016-0122381

(51) Int. Cl.
*H01M 4/38* (2006.01)
*H01M 4/133* (2010.01)
(Continued)

(52) U.S. Cl.
CPC ............. *H01M 4/386* (2013.01); *C22C 29/00* (2013.01); *H01M 4/133* (2013.01); *H01M 4/134* (2013.01);
(Continued)

(58) Field of Classification Search
CPC ...... H01M 4/386; H01M 4/505; H01M 4/134; H01M 4/133; H01M 4/38; H01M 10/0525; C22C 29/00
(Continued)

(56) References Cited

U.S. PATENT DOCUMENTS

| | | | |
|---|---|---|---|
| 6,555,272 B2 * | 4/2003 | Suzuki | H01M 4/134 429/217 |
| 6,730,434 B1 | 5/2004 | Kawakami et al. | |
| 7,906,238 B2 | 3/2011 | Le | |

(Continued)

FOREIGN PATENT DOCUMENTS

| | | |
|---|---|---|
| JP | 2004-185991 A | 7/2004 |
| KR | 10-0698361 B1 | 3/2007 |

(Continued)

*Primary Examiner* — Amanda C. Walke
(74) *Attorney, Agent, or Firm* — Lee & Morse, P.C.

(57) ABSTRACT

A negative electrode active material for a lithium secondary battery including silicon (Si), manganese (Mn), Component A including at least one selected from iron (Fe), molybdenum (Mo), chromium (Cr), zinc (Zn), titanium (Ti), nickel (Ni), vanadium (V), tungsten (W), and yttrium (Y), and Component B including at least one selected from carbon (C), boron (B), oxygen (O), nitrogen (N), phosphorous (P), and sulfur (S), wherein a total amount of Si, Mn, and Component A is about 70 atom % or less, an amount of Component B is 30 atom % or more, and a total amount of Mn and Component A is in a range of about 10 atom % to about 35 atom %.

11 Claims, 6 Drawing Sheets

(51) Int. Cl.
*H01M 4/134* (2010.01)
*C22C 29/00* (2006.01)
*H01M 4/505* (2010.01)
*H01M 10/0525* (2010.01)
*H01M 4/02* (2006.01)

(52) U.S. Cl.
CPC ............ *H01M 4/38* (2013.01); *H01M 4/505* (2013.01); *H01M 10/0525* (2013.01); *H01M 2004/027* (2013.01)

(58) Field of Classification Search
USPC ...................................... 429/218.2
See application file for complete search history.

(56) References Cited

U.S. PATENT DOCUMENTS

| | | | | |
|---|---|---|---|---|
| 8,334,069 | B2* | 12/2012 | Mizutani | H01M 4/133 429/200 |
| 9,337,478 | B2* | 5/2016 | Upreti | H01M 4/364 |
| 9,508,990 | B2* | 11/2016 | Hirono | H01M 4/386 |
| 2007/0148544 | A1* | 6/2007 | Le | B22F 9/002 429/218.1 |
| 2009/0053589 | A1* | 2/2009 | Obrovac | H01M 4/134 429/149 |
| 2011/0084229 | A1* | 4/2011 | Kawakami | H01G 9/155 252/182.1 |
| 2014/0291574 | A1* | 10/2014 | Hong | H01M 4/134 252/182.1 |
| 2014/0332716 | A1* | 11/2014 | Hong | H01M 4/386 252/182.1 |
| 2014/0370386 | A1* | 12/2014 | Hirono | H01M 4/386 429/220 |
| 2015/0232337 | A1* | 8/2015 | Tran | H01M 4/049 429/221 |
| 2016/0181598 | A1* | 6/2016 | Suh | H01M 4/362 429/219 |
| 2016/0197342 | A1* | 7/2016 | Lee | H01M 4/587 429/220 |
| 2016/0276668 | A1* | 9/2016 | Nagayama | H01M 4/587 |
| 2016/0372753 | A1* | 12/2016 | Fukasawa | H01M 4/134 |
| 2017/0098820 | A1* | 4/2017 | Obrovac | H01M 4/04 |
| 2018/0069231 | A1* | 3/2018 | Kim | H01M 4/043 |
| 2018/0175390 | A1* | 6/2018 | Sun | C22C 28/00 |
| 2018/0337390 | A1* | 11/2018 | Chevrier | H01M 4/386 |

FOREIGN PATENT DOCUMENTS

| | | |
|---|---|---|
| KR | 10-2010-0060613 A | 6/2010 |
| KR | 10-2014-0039329 A | 4/2014 |

* cited by examiner

NEGATIVE ELECTRODE ACTIVE MATERIAL FOR LITHIUM SECONDARY BATTERY, AND LITHIUM SECONDARY BATTERY INCLUDING NEGATIVE ELECTRODE INCLUDING THE NEGATIVE ELECTRODE ACTIVE MATERIAL

CROSS-REFERENCE TO RELATED APPLICATION

Korean Patent Application No. 10-2016-0122381, filed on Sep. 23, 2016, in the Korean Intellectual Property Office, and entitled: "Negative Electrode Active Material for Lithium Secondary Battery, and Lithium Secondary Battery Including Negative Electrode Including the Negative Electrode Active Material," is incorporated by reference herein in its entirety.

BACKGROUND

1. Field

Embodiments relate to a negative electrode active material for a lithium secondary battery and a lithium secondary battery including a negative electrode including the negative electrode active material.

2. Description of the Related Art

Lithium secondary batteries have high voltage and high energy density. Due to their high voltage and high energy density, lithium secondary batteries are used in various applications. For example, electric vehicles including hybrid electric vehicles (HEV) and plug-in electric vehicles (PHEV) are driven at high temperature and consume a great amount of electricity. Accordingly, it is desirable that such electric vehicles include lithium secondary batteries that operate at high temperature, that can be charged or discharged with a great amount of electricity, and that show excellent discharge capacity characteristics.

Lithium secondary batteries have excellent battery properties including high electromotive force and high energy density. As the industry advances, batteries having a longer lifespan are desired, and accordingly, research into such batteries is continuously performed.

SUMMARY

Embodiments are directed to a negative electrode active material for a lithium secondary battery including silicon (Si), manganese (Mn), Component A including at least one selected from iron (Fe), molybdenum (Mo), chromium (Cr), zinc (Zn), titanium (Ti), nickel (Ni), vanadium (V), tungsten (W), and yttrium (Y), and Component B including at least one selected from carbon (C), boron (B), oxygen (O), nitrogen (N), phosphorous (P), and sulfur (S), wherein a total amount of Si, Mn, and Component A is about 70 atom % or less, an amount of Component B is 30 atom % or more, and a total amount of Mn and Component A is in a range of about 10 atom % to about 35 atom %.

An amount of Si may be in a range of about 35 atom % to about 56 atom %.

An atomic ratio of Mn to Component A as mixed may be in a range of 1:9 to 9:1.

Component A may be Fe.

The negative electrode active material may be represented by the formula Si-M-carbon (C), in which M includes manganese (Mn) and at least one selected from iron (Fe), molybdenum (Mo), chromium (Cr), zinc (Zn), titanium (Ti), and nickel (Ni).

In the negative electrode active material represented by the formula Si-M-carbon (C), an amount of silicon may be in a range of about 35 atom % to about 58 atom %, an amount of M is in a range of about 10 atom % to about 35 atom %, and an amount of carbon is in a range of about 30 atom % to about 46 atom %.

In the negative electrode active material represented by the formula Si-M-carbon (C), M includes manganese (Mn) and a metal (M1) may include at least one selected from iron (Fe), molybdenum (Mo), chromium (Cr), zinc (Zn), titanium (Ti), and nickel (Ni).

An atomic ratio of manganese to metal (M1) as mixed in M may be in a range of 1:9 to 9:1.

In Si-M-carbon (C), an amount of manganese may be in a range of about 1.2 atom % to about 31.5 atom % based on a total amount of Si-M-carbon (C), and an amount of metal (M1) may be in a range of about 1.2 atom % to about 31.5 atom % based on the total amount of Si-M-carbon (C).

The negative electrode active material may include at least one selected from: $Si_{49.2}Mn_{9.7}Fe_{1.1}C_{40}$, $Si_{49.2}Mn_{5.4}Fe_{5.4}C_{40}$, $Si_{49.2}Mn_{1.1}Fe_{9.7}C_{40}$, $Si_{49.2}Mn_{9.7}Mo_{1.1}C_{40}$, $Si_{49.2}Mn_{5.4}Mo_{5.4}C_{40}$, $Si_{49.2}Mn_{1.1}Mo_{9.7}C_{40}$, $Si_{49.2}Mn_{49.7}Cr_{1.1}C_{40}$, $Si_{49.2}Mn_{5.4}Cr_{5.4}C_{40}$, $Si_{49.2}Mn_{1.1}Cr_{9.7}C_{40}$, $Si_{49.2}Mn_{9.7}Zn_{1.1}C_{40}$, $Si_{49.2}Mn_{5.4}Zn_{5.4}C_{40}$, $Si_{49.2}Mn_{1.1}Zn_{9.7}C_{40}$, $Si_{49.2}Mn_{9.7}Ti_{1.1}C_{40}$, $Si_{49.2}Mn_{5.4}Ti_{5.4}C_{40}$, $Si_{49.2}Mn_{1.1}Ti_{9.7}C_{40}$, $Si_{49.2}Mn_{97}Ni_{1.1}C_{40}$, $Si_{49.2}Mn_{5.4}Ni_{5.4}C_{40}$, $Si_{49.2}Mn_{1.1}Ni_{9.7}C_{40}$, $Si_{48.6}Mn_{10.3}Fe_{1.1}C_{40}$, $Si_{48.6}Mn_{5.7}Fe_{5.7}C_{40}$, $Si_{48.6}Mn_{1.1}Fe_{10.3}C_{40}$, $Si_{48.6}Mn_{10.3}Mo_{1.1}C_{40}$, $Si_{48.6}Mn_{5.7}Mo_{5.7}C_{40}$, $Si_{48.6}Mn_{1.1}Mo_{10.3}C_{40}$, $Si_{48.6}Mn_{10.3}Cr_{1.1}C_{40}$, $Si_{48.6}Mn_{5.7}Cr_{5.7}C_{40}$, $Si_{48.6}Mn_{1.1}Cr_{10.3}C_{40}$, $Si_{48.6}Mn_{10.3}Zn_{1.1}C_{40}$, $Si_{48.6}Mn_{5.7}Zn_{5.7}C_{40}$, $Si_{48.6}Mn_{1.1}Zn_{10.3}C_{40}$, $Si_{48.6}Mn_{10.3}Ti_{1.1}C_{40}$, $Si_{48.6}Mn_{5.7}Ti_{5.7}C_{40}$, $Si_{48.6}Mn_{1.1}Ti_{10.3}C_{40}$, $Si_{48.6}Mn_{10.3}Ni_{1.1}C_{40}$, $Si_{48.6}Mn_{5.7}Ni_{5.7}C_{40}$, $Si_{48}Mn_{1.1}Ni_{10.3}C_{40}$, $Si_{48.0}Mn_{10.8}Fe_{1.2}C_{40}$, $Si_{48.0}Mn_{6.6}Fe_{6.0}C_{40}$, $Si_{48.6}Mn_{1.2}Fe_{10.8}C_{40}$, $Si_{48.0}Mn_{10.8}Mo_{1.2}C_{40}$, $Si_{48.0}Mn_{6.6}Mo_{6.0}C_{40}$, $Si_{48.6}Mn_{2}Mo_{10.8}C_{40}$, $Si_{48.0}Mn_{10.8}Cr_{1.2}C_{40}$, $Si_{48.0}Mn_{6.6}Cr_{6.0}C_{40}$, $Si_{48.6}Mn_{1.2}Cr_{10.8}C_{40}$, $Si_{48.0}Mn_{10.8}Zn_{1.2}C_{40}$, $Si_{48.0}Mn_{6.6}Zn_{6.0}C_{40}$, $Si_{48.6}Mn_{1.2}Zn_{10.8}C_{40}$, $Si_{48.0}Mn_{10.8}Ti_{1.2}C_{40}$, $Si_{48.0}Mn_{6.6}Ti_{6.0}C_{40}$, $Si_{48.6}Mn_{1.2}Ni_{10.8}C_{40}$, $Si_{48.0}Mn_{10.8}Ni_{1.2}C_{40}$, $Si_{48.0}Mn_{6.6}Ni_{6.0}C_{40}$, $Si_{48.6}Mn_{1.2}Ni_{10.8}C_{40}$, $Si_{47.4}Mn_{11.3}Fe_{1.3}C_{40}$, $Si_{47.4}Mn_{6.3}Fe_{6.3}C_{40}$, $Si_{47.4}Mn_{1.3}Fe_{11.3}C_{40}$, $Si_{47.4}Mn_{1.3}Mo_{1.3}C_{40}$, $Si_{47.4}Mn_{6.3}Mo_{6.3}C_{40}$, $Si_{47.4}Mn_{1.3}Mn_{11.3}C_{40}$, $Si_{47.4}Mn_{11.3}Cr_{1.3}C_{40}$, $Si_{47.4}Mn_{6.3}Cr_{6.3}C_{40}$, $Si_{47.4}Mn_{1.3}Cr_{11.3}C_{40}$, $Si_{47.4}Mn_{11.3}Zn_{1.3}C_{40}$, $Si_{47.4}Mn_{6.3}Zn_{6.3}C_{40}$, $Si_{47.4}Mn_{1.3}Zn_{11.3}C_{40}$, $Si_{47.4}Mn_{11.3}Ti_{1.3}C_{40}$, $Si_{47.4}Mn_{6.3}Ti_{6.3}C_{40}$, $Si_{47.4}Mn_{1.3}Ti_{11.3}C_{40}$, $Si_{47.4}Mn_{11.3}Ni_{1.3}C_{40}$, $Si_{47.4}Mn_{6.3}Ni_{6.3}C_{40}$, $Si_{47.4}Mn_{1.3}Ni_{11.3}C_{40}$, $Si_{46.8}Mn_{11.9}Fe_{1.3}C_{40}$, $Si_{46.8}Mn_{6.6}Fe_{6.6}C_{40}$, $Si_{46.8}Mn_{1.3}Fe_{11.9}C_{40}$, $Si_{46.8}Mn_{11.9}Mo_{1.3}C_{40}$, $Si_{46.8}Mn_{6}Mo_{6.6}C_{40}$, $Si_{46.8}Mn_{1.3}Mo_{11.9}C_{40}$, $Si_{46.8}Mn_{11.9}Cr_{1.3}C_{40}$, $Si_{46.8}Mn_{6.6}Cr_{6.6}C_{40}$, $Si_{46.8}Mn_{1.3}Cr_{11.9}C_{40}$, $Si_{46.8}Mn_{11.9}Zn_{1.3}C_{40}$, $Si_{46.8}Mn_{6}Zn_{6.6}C_{40}$, $Si_{46.8}Mn_{1.3}Zn_{11.9}C_{40}$, $Si_{46.8}Mn_{11.9}Ti_{1.3}C_{40}$, $Si_{46.8}Mn_{6.6}Ti_{6.6}C_{40}$, $Si_{46.8}Mn_{1.3}Ti_{11.9}C_{40}$, $Si_{46.8}Mn_{11.9}Ni_{1.3}C_{40}$, $Si_{46.8}Mn_{6.6}Ni_{6.6}C_{40}$, $Si_{46.8}Mn_{1.3}Ni_{11.9}C_{40}$, $Si_{46.2}Mn_{12.4}Fe_{1.4}C_{40}$, $Si_{46.2}Mn_{6.9}Fe_{6.9}C_{40}$, $Si_{46.2}Mn_{1.4}Fe_{12.4}C_{40}$, $Si_{46.2}Mn_{12.4}Mo_{1.4}C_{40}$, $Si_{46.2}Mn_{6.9}Mo_{6.9}C_{40}$, $Si_{46.2}Mn_{1.4}Mo_{12.4}C_{40}$, $Si_{46.2}Mn_{12.4}Cr_{1.4}C_{40}$, $Si_{46.2}Mo_{6.9}Cr_{6.9}C_{40}$, $Si_{46.2}Mn_{1.4}Cr_{1.4}C_{40}$, $Si_{46.2}Mn_{12.4}Zn_{1.4}C_{40}$, $Si_{46.2}Mn_{6.9}Zn_{6.9}C_{40}$, $Si_{46.2}Mn_{1.4}Zn_{12.4}C_{40}$, $Si_{46.2}Mn_{12.4}Ti_{1.4}C_{40}$, $Si_{46.2}Mn_{6.9}Ti_{6.9}C_{40}$, $Si_{46.2}Mn_{1.4}Ti_{12.4}C_{40}$, $Si_{46.2}Mn_{12.4}Ni_{1.4}C_{40}$, $Si_{46.2}Mn_{6.9}Ni_{6.9}C_{40}$, $Si_{46.2}Mn_{1.4}Ni_{12.4}C_{40}$, $Si_{54.6}Mn_{13.9}Fe_{2.5}C_{40}$, $Si_{50.7}Mn_{12.9}Fe_{1.4}C_{40}$, $Si_{46.8}Mn_{11.9}Fe_{1.3}C_{40}$, $Si_{33.0}Mn_{24.3}Fe_{2.7}C_{40}$, $Si_{35.0}Mn_{22.5}Fe_{2.5}C_{40}$, $Si_{46.8}Mn_{11.9}Fe_{1.3}C_{40}$, and $Si_{56.0}Mn_{3.6}Fe_{0.4}C_{40}$.

An average crystal grain size of the negative electrode active material may be in a range of about 0.5 nm to about 50 nm. An average particle size of the negative electrode active material may be in a range of about 0.5 μm to about 10 μm.

Embodiments are also directed to a lithium secondary battery includes a negative electrode including the negative electrode active material.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
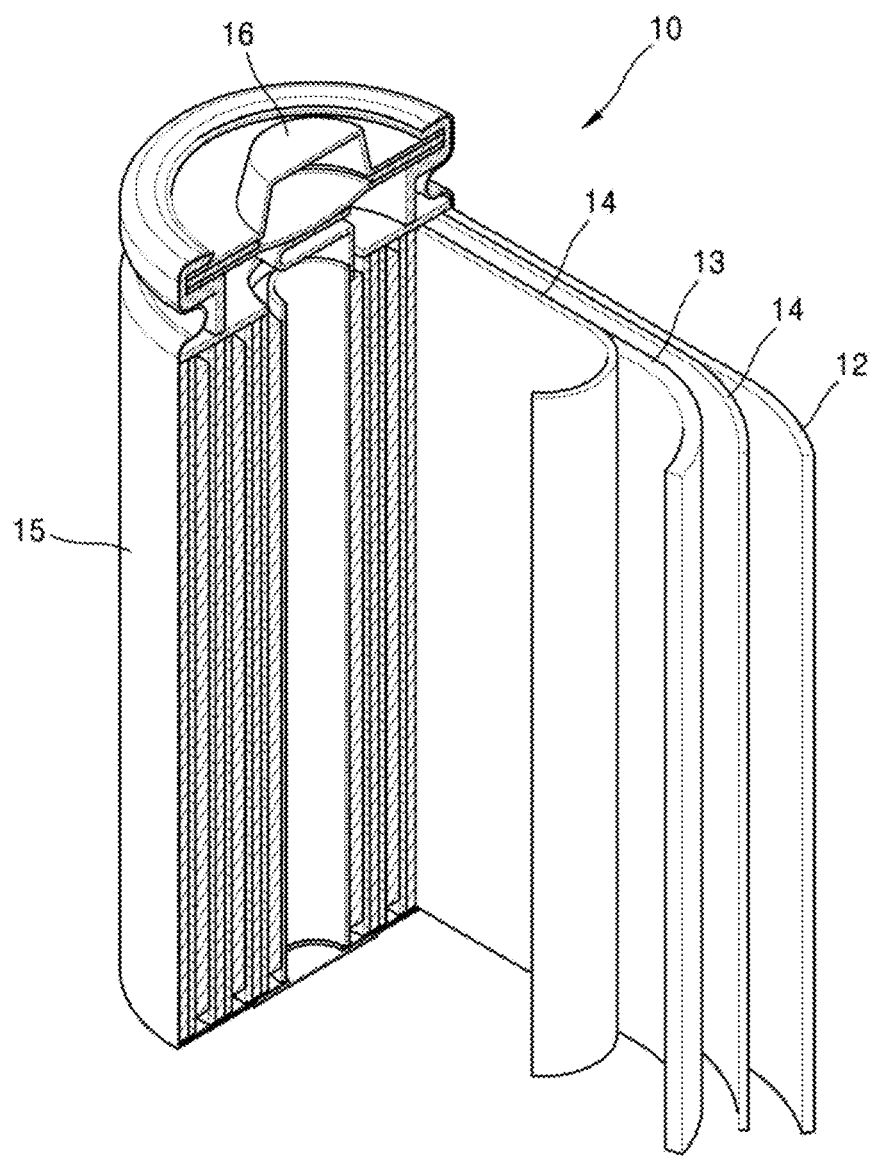
FIG. 1 illustrates a schematic view of a lithium secondary battery according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration.

Hereinafter, a negative electrode active material for a lithium secondary battery, according to example embodiments and a lithium secondary battery including a negative electrode including the negative electrode active material according to example embodiments will be described in detail.

A negative electrode active material for a lithium secondary battery, according to a embodiment may include silicon (Si); manganese (Mn); Component A, which includes at least one selected from iron (Fe), molybdenum (Mo), chromium (Cr), zinc (Zn), titanium (Ti), nickel (Ni), vanadium (V), tungsten (W), and yttrium (Y); and Component B, which includes at least one selected from carbon (C), boron (B), oxygen (O), nitrogen (N), phosphorous (P) and sulfur (S), wherein a total amount of Si, Mn, and Component A is about 70 atom % (at %) or less, an amount of Component B is about 30 at % or more, and a total amount of Mn and Component A is in a range of about 10 at % to about 35 at %.

In an example embodiment, regarding the negative electrode active material for a lithium secondary battery, a total amount of Si, Mn, and Component A may be about 70 at % or less, or, for example, about 60 at % to about 70 at %. An amount of Component B may be 30 at % or more, and a total amount of Mn and Component A may be in a range of about 12 at % to about 35 at %.

When the total amount of Si, Mn, and Component A, the amount of Component B, and the total amount of Mn and Component A are within these ranges, the negative electrode active material may suppress a volumetric change during charging and discharging, and, accordingly, a lithium secondary battery including a negative electrode including the negative electrode active material may have improved capacity and lifespan characteristics.

In an example embodiment, an amount of Si included in the negative electrode active material may be in a range of about 35 at % to about 56 at %. An atomic ratio of Mn to Component A may be in a range of 1:9 to 9:1.

Component A may be, for example, Fe, Mo, Cr, Zn, Ti, or Ni.

In an example embodiment, the negative electrode active material may be represented by the formula Si-M-carbon (C), wherein M includes manganese (Mn) and at least one selected from, iron (Fe), molybdenum (Mo), chromium (Cr), zinc (Zn), titanium (Ti), and nickel (Ni).

Regarding the negative electrode active material represented by the formula Si-M-carbon (C), an amount of Si may be in a range of about 35% to about 58%, an amount of M may be in range of about 10 at % to about 35 at %, and an amount of carbon may be in a range of about 30 at % to about 46 at %.

In the negative electrode active material represented by the formula Si-M-carbon (C), M includes manganese (Mn) and a metal ($M_1$) that is at least one selected from iron (Fe), molybdenum (Mo), chromium (Cr), zinc (Zn), titanium (Ti), and nickel (Ni). In this regard, manganese is present in each composition, (M1) represents a narrowed selection from Component A above, and carbon (C) represents the selection of carbon (C) from Component B above. An amount of manganese may be in a range of about 1.2 at % to about 31.5 at % based on the total amount of Si-M-carbon (C). An amount of metal ($M_1$) may be in a range of about 1.2 at % to about 31.5 at % based on the total amount of Si-M-carbon (C).

An atomic ratio of manganese to metal ($M_1$) in M may be in a range of 1:9 to 9:1. When the atomic ratio of manganese to metal ($M_1$) is within this range, a lithium secondary battery including a negative electrode including the negative electrode active material may have improved capacity retention ratio and capacity characteristics.

Carbon may exist inside and outside the structure of Si-M-carbon (C).

The carbon (C) may include at least one carbonaceous material selected from plate-shape graphite, pitch carbon, artificial graphite, natural graphite, graphinated carbon fiber, graphinated mesocarbon microbead (MCMB), petroleum coke, resin sintered product, carbon fiber, graphene, and fullerene.

In an example embodiment, the negative electrode active material may include at least one selected from $Si_{49.2}Mn_{9.7}Fe_{1.1}C_{40}$, $Si_{40.2}Mn_{5.4}Fe_{5.4}C_{40}$, $Si_{49.2}Mn_{1.1}Fe_{9.7}C_{40}$, $Si_{49.2}Mn_{9.7}Mo_{1.1}C_{40}$, $Si_{40.2}Mn_{5.4}Mo_{5.4}C_{40}$, $Si_{49.2}Mn_{1.1}Mo_{9.7}C_{40}$, $Si_{49.2}Mn_{9.7}Cr_{1.1}C_{40}$, $Si_{49.2}Mn_{5.4}Cr_{5.4}C_{40}$, $Si_{49.2}Mn_{1.1}Cr_{9.7}C_{40}$, $Si_{49.2}Mn_{9.7}Zn_{1.1}C_{40}$, $Si_{49.2}Mn_{5.4}Zn_{5.4}C_{40}$, $Si_{49.2}Mn_{1.1}Zn_{9.7}C_{40}$, $Si_{49.2}Mn_{9.7}Ti_{1.1}C_{40}$, $Si_{49.2}Mn_{5.4}Ti_{5.4}C_{40}$, $Si_{49.2}Mn_{1.1}Ti_{9.7}C_{40}$, $Si_{49.2}Mn_{9.7}Ni_{1.1}C_{40}$, $Si_{49.2}Mn_{5.4}Ni_{5.4}C_{40}$, $Si_{49.2}Mn_{1.1}Ni_{9.7}C_{40}$, $Si_{48.6}Mn_{10.3}Fe_{1.1}C_{40}$, $Si_{48.6}Mn_{5.7}Fe_{5.7}C_{40}$, $Si_{48.6}Mn_{1.1}Fe_{10.3}C_{40}$, $Si_{48.6}Mn_{10.3}Mo_{1.1}C_{40}$, $Si_{48.6}Mn_{5.7}Mn_{5.7}C_{40}$, $Si_{48.6}Mn_{1.1}Mo_{10.3}C_{40}$, $Si_{6.6}Mn_{10.3}Cr_{1.1}C_{40}$, $Si_{48.6}Mn_{5.7}Cr_{5.7}C_{40}$, $Si_{48.6}Mn_{1.1}Cr_{10.3}C_{40}$, $Si_{48.6}Mn_{10.3}Zn_{1.1}C_{40}$, $Si_{48.6}Mn_{5.7}Zn_{5.7}C_{40}$, $Si_{48.6}Mn_{1.1}Zn_{10.3}C_{40}$, $Si_{48.6}Mn_{10.3}Ti_{1.1}C_{40}$, $Si_{48.6}Mn_{5.7}Ti_{5.7}C_{40}$, $Si_{48.6}Mn_{1.1}Ti_{10.3}C_{40}$, $Si_{48.6}Mn_{10.3}Ni_{1.1}$ $Si_{48.6}Mn_{5.7}Ni_{5.7}C_{40}$, $Si_{48.6}Mn_{1.1}Ni_{10.3}C_{40}$, $Si_{48.0}Mn_{10.8}Fe_{1.2}C_{40}$, $Si_{48.0}Mn_{6.6}Fe_{6.0}C_{40}$, $Si_{48.6}Mn_{1.2}Fe_{10.8}C_{40}$, $Si_{48.0}Mn_{10.8}Mo_{1.2}C_{40}$, $Si_{48.0}Mn_{6.6}Mo_{6.0}C_{40}$, $Si_{48.6}Mn_{1.2}Mo_{10.8}C_{40}$, $Si_{48.0}Mn_{10.8}Cr_{1.2}C_{40}$, $Si_{48.0}Mn_{6.6}Cr_{6.0}C_{40}$, $Si_{48.6}Mn_{1.2}Cr_{10.8}C_{40}$, $Si_{48.0}Mn_{10.8}Zn_{1.2}C_{40}$, $Si_{48.0}Mn_{6.6}Zn_{6.0}C_{40}$, $Si_{48.6}Mn_{1.2}Zn_{10.8}C_{40}$, $Si_{48.0}Mn_{10.8}Ti_{1.2}C_{40}$, $Si_{48.6}Mn_{6.6}Ti_{6.0}C_{40}$, $Si_{48.6}Mn_{1.2}Ti_{10.8}C_{40}$, $Si_{48.0}Mn_{10.8}Ni_{1.2}C_{40}$, $Si_{48.0}Mn_{6.6}Ni_{6.0}C_{40}$, $Si_{48.6}Mn_{1.2}Ni_{10.8}C_{40}$, $Si_{47.4}Mn_{11.3}Fe_{1.3}C_{40}$, $Si_{47.4}Mn_{6.3}Fe_{6.3}C_{40}$, $Si_{47.4}Mn_{1.3}Fe_{11.3}C_{40}$, $Si_{47.4}Mn_{11.3}Mo_{1.3}C_{40}$, $Si_{47.4}Mn_{6.3}Mo_{6.3}C_{40}$, $Si_{47.4}Mn_{1.3}Mo_{11.3}C_{40}$, $Si_{47.4}Mn_{11.3}Cr_{1.3}C_{40}$, $Si_{47.4}Mn_{6.3}Cr_{6.3}C_{40}$, $Si_{47.4}Mn_{1.3}Cr_{11.3}C_{40}$, $Si_{47.4}Mn_{11.3}Zn_{1.3}C_{40}$, $Si_{47.4}Mn_{6.3}Zn_{6.3}C_{40}$, $Si_{47.4}Mn_{1.3}Zn_{11.3}C_{40}$, $Si_{47.4}Mn_{11.3}Ti_{1.3}C_{40}$, $Si_{47.4}Mn_{6.3}Ti_{9.3}C_{40}$, $Si_{47.4}Mn_{1.3}Ti_{11.3}C_{40}$, $Si_{47.4}Mn_{11.3}Fe_{1.3}C_{40}$, $Si_{47.4}Mn_{6.3}Ni_{6.3}C_{40}$, $Si_{7.4}Mn_{1.3}Ni_{11.3}C_{40}$, $Si_{46.8}Mn_{11.9}Fe_{1.3}C_{40}$, $Si_{46.8}Mn_{6.6}Fe_{6.6}C_{40}$, $Si_{46.8}Mn_{1.3}Fe_{11.9}C_{40}$, $Si_{46.8}Mn_{11.0}Mo_{1.3}C_{40}$, $Si_{46.8}Mn_{6.6}Mo_{6.6}C_{40}$, $Si_{46.8}Mn_{1.3}Mo_{11.9}C_{40}$, $Si_{46.8}Mn_{11.9}Cr_{1.3}C_{40}$, $Si_{46.8}Mn_{6.6}Cr_{6.6}C_{40}$, $Si_{49.8}Mn_{1.3}Cr_{11.9}C_{40}$, $Si_{46.8}Mn_{11.9}Zn_{1.3}C_{40}$, $Si_{46.8}Mn_{6.6}Zn_{6.6}C_{40}$, $Si_{46.8}Mn_{1.3}Zn_{1.9}C_{40}$, $Si_{46.8}Mn_{11.9}Ti_{1.3}C_{40}$, $Si_{46.8}Mn_{6.6}Ti_{6.6}C_{40}$, $Si_{46.8}Mn_{1.3}Ti_{11.9}C_{40}$, $Si_{46.8}Mn_{11.9}Ni_{1.3}C_{40}$, $Si_{46.8}Mn_{6.6}Ni_{6.6}C_{40}$, $Si_{46.8}Mn_{1.3}Ni_{1.9}C_{40}$, $Si_{46.2}Mn_{12.4}Fe_{1.4}C_{40}$, $Si_{46.2}Mn_{6.9}Fe_{6.9}C_{40}$, $Si_{46.2}Mn_{1.4}Fe_{12.4}C_{40}$, $Si_{46.2}Mn_{12.4}Mo_{1.4}C_{40}$, $Si_{46.2}Mn_{6.9}Mo_{6.9}C_{40}$, $Si_{46.2}Mn_{1.4}Mo_{12.4}C_{40}$, $Si_{46.2}Mn_{12.4}Cr_{1.4}C_{40}$, $Si_{46.2}Mn_{6.9}Cr_{6.9}C_{40}$, $Si_{46.2}Mn_{1.4}Cr_{12.4}C_{40}$, $Si_{46.2}Mn_{12.4}Zn_{1.4}C_{40}$, $Si_{46.2}Mn_{6.9}Zn_{6.9}C_{40}$, $Si_{46.2}Mn_{1.4}Zn_{12.4}C_{40}$, $Si_{46.2}Mn_{12.4}Cr_{1.4}C_{40}$, $Si_{46.2}Mn_{6.9}Ti_{6.9}C_{40}$, $Si_{46.2}Mn_{1.4}Ti_{12.4}C_{40}$, $Si_{46.2}Mn_{12.4}Ni_{1.4}C_{40}$, $Si_{46.2}Mn_{6.9}Ni_{6.9}C_{40}$, $Si_{46.2}Mn_{1.4}Ni_{12.4}C_{40}$, $Si_{54.6}Mn_{13.9}Fe_{1.5}C_{40}$, $Si_{50.7}Mn_{12.9}Fe_{1.4}C_{40}$, $Si_{46.8}Mn_{11.9}Fe_{1.3}C_{40}$, $Si_{33.0}Mn_{24.3}Fe_{2.7}C_{40}$, $Si_{35.0}Mn_{22.5}Fe_{2.5}C_{40}$, $Si_{46.8}Mn_{11.9}Fe_{1.3}C_{40}$, and $Si_{56.0}Mn_{3.6}Fe_{0.4}C_{40}$.

Hereinafter, a method of manufacturing the negative electrode active material according to an example embodiment will be described in detail.

As starting materials for forming the negative electrode active material, silicon (Si), manganese (Mn), and Component A including at least one selected from iron (Fe), molybdenum (Mo), chromium (Cr), zinc (Zn), titanium (Ti), nickel (Ni), vanadium (V), tungsten (W), and yttrium (Y), may be measured and dissolved to prepare a mother alloy. The mother alloy may be ground down to particles of a diameter of about 100 μm or less.

A product obtained by the grinding may be subjected to mechanical alloying. For the mechanical alloying, a sealed vessel may be used to prevent oxidization of materials therein that could occur due to mixing with oxygen and moisture, and a mechanical alloying reaction may be performed by using an inert gas, such as argon gas. A product obtained by the mechanical alloying may be ground and sieved to control a particle diameter of the materials.

In one example embodiment, the mechanical alloying may be performed by using a horizontal attrition mill.

To the product obtained by the mechanical alloying, a carbonaceous material, for example, plate-shape graphite may be added as Component B and a milling process may be performed to obtain a product in which the carbonaceous material forms a composite inside the particles obtained by the mechanical alloying.

To the resultant product, an additional carbonaceous material such as pitch carbon may be added, and then, vacuum heat treatment may be performed thereon under an inert gas atmosphere, thereby obtaining a product in which the additional carbonaceous material forms a composite on the surface of the particles. The vacuum heat treatment may be performed at a temperature of about 300° C. to about 600° C. The inert gas atmosphere may be formed by supplying, for example, argon gas, nitrogen gas, or the like.

Then, the resultant product may be ground, and classified according to size, thereby completing the preparation of the negative electrode active material according to an example embodiment.

The negative electrode active material may have an average crystal grain size of about 0.5 nm to about 50 nm. The negative electrode active material may have an average particle size of about 0.5 μm to about 10 μm. When a particle is spherical, the "average crystal grain size" may refer to a diameter of the particle. When a particle is not spherical, the term "the average particle size" may refer to a longest length of the particle.

A method of manufacturing a lithium secondary battery including a negative electrode including the negative electrode active material for a lithium secondary battery will be described in detail.

A negative electrode active material according to an example embodiment, a conductive agent, a binder, and a solvent may be mixed to prepare a negative electrode active material composition, which may then be coated and dried on a negative electrode current collector.

The negative electrode active material composition according to an example embodiment may further include, in addition to the negative electrode active material described herein, an additional negative electrode active material suitable for a lithium secondary battery.

The additional negative electrode active material may be selected from a carbonaceous material, such as graphite, that enables intercalation or deintercalation of lithium ions or carbon, lithium metal, an alloy thereof, a silicon oxide-based material, and a mixture thereof.

When the negative electrode active material according to example embodiments is a major component, an amount of the negative electrode active material may be in a range of, for example, about 95 parts to about 99 parts by weight, based on the total amount of the negative electrode active material and the additional negative electrode active material. When graphite or carbon pitch, which is an amorphous carbon, is used as the additional negative electrode active material, graphite or carbon pitch may be further coated on the negative electrode active material.

When the negative electrode active material according to example embodiments is a minor component, an amount of the negative electrode active material according to example embodiments may be in a range of, for example, about 1 part to about 5 parts by weight, based on the total amount of the negative electrode active material according to embodiments and the additional negative electrode active material. When graphite or carbon pitch, which is an amorphous carbon, is used as the additional negative electrode active material, the graphite or carbon pitch may function as a buffer for the negative electrode active material according to an example embodiment, contributing to a longer lifespan of an anode.

The binder may be used in an amount of about 1 part to about 10 parts by weight based on 100 parts by weight of the total weight of the negative electrode active material. Examples of the binder include polyvinylidene fluoride, polyvinylalcohol, carboxymethylcellulose (CMC), starch, hydroxypropylcellulose, regenerated cellulose, polyvinylpyrrolidone, polyamideimide, polyethylene, polypropylene, ethylene-propylene-diene terpolymer (EPDM), sulfonated EPDM, styrene-butadiene rubber, fluoro rubber, or a vinylidene fluoride copolymer including at least one functional group selected from a carboxyl group, an epoxy group, a hydroxyl group, and a carbonyl group.

When the amount of the binder is within this range, a binding force of an active material to a current collector may be increased, thereby allowing manufacture of an electrode and a battery, each having improved lifespan and stability characteristics.

The conductive agent may be a suitable conductive agent that does not cause chemical changes in a corresponding battery and has conductivity. Examples of the conductive agent may include graphite, such as natural graphite or artificial graphite; a carbonaceous material, such as carbon black, acetylene black, Ketjen black, channel black, furnace black, lamp black, or thermal black; a conductive fiber, such as carbon fiber or metal fiber; carbon fluoride, metal powder such as aluminum, or nickel powder; conductive whiskers, such as oxidized zinc or potassium titanate; a conductive metal oxide, such as a titanium oxide; and a conductive material, such as a polyphenylene derivative.

The conductive agent may be used in an amount of about 2 parts to about 5 parts by weight based on 100 parts by weight of the total weight of the negative electrode active material. When the amount of the conductive agent is within this range, the obtained electrode may have excellent conductivity characteristics.

The solvent may include, for example, N-methylpyrrolidone.

The amount of the solvent may be in a range of 1 part to 10 parts by weight based on 100 parts by weight of the total weight of the negative electrode active material. When the amount of the solvent is within this range, an active material layer may be easily formed.

The negative electrode current collector may have a thickness of about 3 µm to about 500 µm. The negative electrode current collector may be may be a suitable current collector that does not cause chemical changes in a corresponding battery and has conductivity. Examples of the negative electrode current collector may include copper, stainless steel, aluminum, nickel, titanium, heat-treated carbon, copper; stainless steel surface-treated with carbon, nickel, titanium, or silver; and an aluminum-cadmium alloy.

In some implementations, the negative electrode current collector may have a surface including fine uneven structures, allowing the negative electrode active material to bind strongly thereto. The negative electrode current collector may be used in the form of, for example, a film, a sheet, a foil, a net, a porous structure, a foam, or a non-woven fabric.

A positive electrode may be manufactured in the same manner as the negative electrode as described above, except that a positive electrode active material is used instead of the negative electrode active material.

The positive electrode may be manufactured by using the same binder, conductive agent, and solvent as used in manufacturing the negative electrode described above.

A positive electrode current collector may have a thickness of about 3 µm to about 500 µm. The positive electrode current collector may be a suitable current collector that does not cause chemical changes in a corresponding battery and has conductivity. Examples of the positive electrode current collector include stainless steel, aluminum, nickel, titanium, heat-treated carbon, aluminum, or stainless steel surface-treated with carbon, nickel, titanium, or silver. The positive electrode current collector may have a surface including fine uneven structures, allowing the positive electrode active material to bind strongly thereto. The positive electrode current collector may be used in the form of, for example, a film, a sheet, a foil, a net, a porous structure, a foam, or a non-woven fabric.

A separator may be disposed between the positive electrode and the negative electrode. A thin, conductive film having high ion permeation and mechanical strength may be used as the separator.

The diameter of pores included in the separator may be in a range of about 0.01 µm to about 10 µm. The thickness of the separator may be in a range of about 5 µm to about 20 µm. Examples of materials for the separator may include an olefin-based polymer, such as polypropylene, or a sheet or non-woven fabric formed of glass fiber or polyethylene. The electrolyte of the lithium secondary battery may be a solid polymer electrolyte. In this case, the solid polymer electrolyte may also be used as the separator.

Examples of the olefin-based polymer that may be used in the separator include polyethylene, polypropylene, and polyvinylidene fluoride, each of which may be formed as a multi-layer. In one example embodiment, the separator may have a multi-layer structure including different materials, for example, a two-layered polyethylene/polypropylene structure, a three-layered polyethylene/polypropylene/polyethylene structure, or a three-layered polypropylene/polyethylene/polypropylene structure.

An electrolyte may be provided between the positive electrode and the negative electrode.

The electrolyte may be a liquid electrolyte or a solid electrolyte.

The liquid electrolyte may include a non-aqueous solvent and a lithium salt. The solid electrolyte may be an organic solid electrolyte or an inorganic solid electrolyte.

Examples of the non-aqueous solvent include an aprotic organic solvent. Examples of the aprotic organic solvent include N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyltetrahydrofurane, dimethylsulfoxide, 1,3-dioxorane, N,N-formamide, N,N-dimethylformamide, dioxorane, acetonitrile, nitromethane, methyl formate, methyl acetate, triester phosphate, trimethoxy methane, dioxorane derivative, sulforane, methyl sulforane, 1,3-dimethyl-2-imidazolidinone, a propylene carbonate derivative, a tetrahydrofurane derivative, ether, methyl propionate, and ethyl propionate.

Examples of the solid electrolyte include a polyethylene derivative, a polyethylene oxide derivative, polypropylene oxide derivative, ester phosphate polymer, polyester sulfide, polyvinyl alcohol, and poly vinyllidene fluoride.

Examples of the solid electrolyte include a nitride, halide, or sulfide of Li, such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, or the like.

The lithium salt may be any material dissolvable in the non-aqueous electrolyte. Non-limiting examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, lithium chloro borate, lower aliphatic lithium carbonate, and tetraphenyl lithium borate.

The amount of the lithium salt may be in a range of, for example, about 0.1M to about 2M. When the amount of the lithium salt is within this range, the electrolyte may have high ion-conductivity.

To improve charge and discharge characteristics and reduce flammability, the electrolyte may further include, for example, pyridine, triethylphosphate, triethanolamine, cyclic ether, ethylene diamine, n-glyme, hexamethyl phosphoramide, a nitrobenzene derivative, sulfur, quinone imine dye, N-substituted oxazolidinone, N,N-substituted imidazolidine, ethylene glycol dialkyl ether, ammonium salt, pyrrole, 2-methoxy ethanol, aluminum trichloride, or the like. In some cases, to provide non-flammability, the electrolyte may further include a halogen-containing solvent including carbon trichloride or ethylene trifluoride.

FIG. 1 illustrates a schematic view of a lithium secondary battery 10 according to an embodiment.

Referring to FIG. 1, the lithium secondary battery 10 may include a positive electrode 13, a negative electrode 12, and a separator 14 between the positive electrode 13 and the negative electrode 12, an electrolyte with which the positive electrode 13, the negative electrode 12, and the separator 14 are impregnated, a battery case 15 and a cap assembly 16 sealing the battery case 15. In the lithium secondary battery 10, the positive electrode 13, the negative electrode 12, and the separator 14 are sequentially stacked and then placed in the battery case 15 while or after being spirally rolled. The battery case may be sealed with the cap assembly 16 to thereby complete the manufacture of a lithium secondary battery 10.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Examples 1-17

Metals for forming a negative electrode active material were measured in amounts shown in Table 1 and mixed to prepare a mother alloy. For each case, the mother alloy was ground into particles of a size (diameter) of about 100 μm or less.

The mother alloy and a stearic acid ($C_{18}H_{36}O_2$), as a process control agent (PCA), were loaded into a horizontal attrition mill (Simoloyer CM01, Zoz-GmbH), followed by adding a ball (a Cr steel ball having a diameter of 4.7 mm and a weight of 15 kg) thereto. Then, mechanical alloying was performed thereon at a rate of 1,300 rpm for 8 hours. A sealed case was used to prevent oxidation of materials that might be caused by oxygen and moisture permeating thereinto, and argon gas was provided for about 30 minutes. A particle diameter of the resultant was controlled by grinding and sieving.

Plate-shape graphite was added to the resultant obtained, and then, the mixture was loaded into a horizontal attrition mill (Simoloyer CM01. Zoz-GmbH), and a ball (Cr steel ball having a diameter of 4.7 mm and a weight of 15 kg) was added thereto. Then, the mixture was milled at a rate of 1,300 rpm for about 1 hour.

The milled product was mixed with pitch carbon, and then the mixture was vacuum heat treated at a temperature of about 400° C. for about 8 hours in an argon gas atmosphere. Then, the resultant was loaded into an Air jet mill (Kmtech) at a pressure of about 0.5 MPa and a speed of 1 g/min, and then, milled at 0.2 MPa, thereby completing the preparation of negative electrode active materials according to Examples 1 to 17.

TABLE 1

|  | Si | Mn | Fe | C |
| --- | --- | --- | --- | --- |
| Example 1 | 49.2 | 9.7 | 1.1 | 40.0 |
| Example 2 | 49.2 | 5.4 | 5.4 | 40.0 |
| Example 3 | 49.2 | 1.1 | 9.7 | 40.0 |
| Example 4 | 48.6 | 10.3 | 1.1 | 40.0 |
| Example 5 | 48.6 | 5.7 | 5.7 | 40.0 |
| Example 6 | 48.6 | 1.1 | 10.3 | 40.0 |
| Example 7 | 48 | 10.8 | 1.2 | 40.0 |
| Example 8 | 48 | 6 | 6 | 40.0 |
| Example 9 | 48 | 1.2 | 10.8 | 40.0 |
| Example 10 | 47.4 | 11.3 | 1.3 | 40.0 |
| Example 11 | 47.4 | 6.3 | 6.3 | 40.0 |
| Example 12 | 47.4 | 1.3 | 11.3 | 40.0 |
| Example 13 | 46.8 | 11.9 | 1.3 | 40.0 |
| Example 14 | 46.8 | 6.6 | 6.6 | 40.0 |
| Example 15 | 46.8 | 1.3 | 11.9 | 40.0 |
| Example 16 | 54.6 | 13.9 | 1.5 | 30.0 |
| Example 17 | 50.7 | 12.9 | 1.4 | 35.0 |

Comparative Examples 1 to 3

Metals for forming a negative electrode active material were measured in amounts shown in Table 2 and mixed to prepare a mother alloy. For each case, the mother alloy was ground into particles of a size (diameter) of about 100 μm or less.

The mother alloy and a stearic acid, as a PCA, were loaded into a horizontal attrition mill (Simoloyer CM01, Zoz-GmbH), and then a ball was added (a Cr steel ball having a diameter of 4.7 mm and a weight of 15 kg) thereto. Then, mechanical alloying was performed thereon at a rate of 1,300 rpm for 8 hours. A sealed case was used to prevent oxidation of materials that might be caused by oxygen and moisture permeating thereinto, and argon gas was provided for about 30 minutes. A particle diameter of the resultant was controlled by grinding and sieving.

The obtained result was loaded to an air jet mill (Kmtech) at a pressure of about 0.5 MPa and at a speed of 1 g/min. and then, milled at a pressure of 0.2 MPa, thereby completing the preparation of negative electrode active materials according to Comparative Examples 1 to 3.

TABLE 2

|  | Si | Mn | Fe | C |
|---|---|---|---|---|
| Comparative Example 1 | 71 | 20 | — | 9 |
| Comparative Example 2 | 72 | — | 19 | 9 |
| Comparative Example 3 | 61 | 8 | 1 | 30 |

Manufacture Example 1: Manufacture of Lithium Secondary Battery

An aqueous binder LPIM37B (an acryl-based binder manufactured by Aekyung Chemical) and Ketjen black were mixed for 2 minutes by using a Thinky mixer.

Then, the negative electrode active material prepared according to Example 1, artificial graphite (MITSUBISHI), and plate-shape graphite (TIMCAL TIMREX) were added in suitable amounts. The ratio of artificial graphite to plate-shape graphite was maintained at 70:30. Distilled water was added to the resultant mixed powder and then mixed for 2 minutes. This process was repeatedly performed to control the solid content in the product. Then, the resultant was mixed for 10 minutes to complete the preparation of a negative electrode slurry. The negative electrode slurry was coated and dried on a copper current collector, thereby completing the manufacture of a negative electrode. The negative electrode had an load level (L/L) of 4.8 mg/cm$^2$ to 4.9 mg/cm$^2$ and a mixed density of 1.5 g/cc. The negative electrode was subjected to vacuum-drying/curing at a temperature of 110° C. for 6 hours. A separator used herein was Star 20 (Asahi, Japan), and an electrolytic solution used herein was 1.0M LiPF$_6$ dissolved in a mixed solvent including ethylene carbonate (EC), diethyl carbonate (DEC), and fluoroethylene carbonate (FEC) at a volumetric ratio of 5:70:25. A coin cell was manufactured by sequentially assembling the negative electrode, the separator, a gasket, and a positive electrode.

A charging and discharging test was performed at 0.1C/0.1C once, at 0.2C/0.2C once, and at 1.0C/1.0C 100 times, and lifespan characteristics were compared. In this regard, conditions for the charging and discharging test included CC-CV (4.2V, 0.01C cut-off), and CV (2.5V cut-off).

Manufacture Examples 2 to 17

Coin cells were manufactured in the same manner as in Manufacture Example 1, except that the negative electrode active materials prepared according to Examples 2 to 17 were used instead of the negative electrode active material of Example 1.

Comparative Manufacture Examples 1-3

Coin cells were manufactured in the same manner as in Manufacture Example 1, except that the negative electrode active materials prepared according to Comparative Examples 1 to 3 were used instead of the negative electrode active material of Example 1.

Evaluation Example 1: Initial Charge and Discharge Efficiency and Capacity Retention Ratio Initial charge efficiency (I.C.E) and discharge capacity of the lithium secondary batteries prepared according to Manufacture Examples 1 to 17 and Comparative Manufacture Examples 1 to 3 were measured. Results thereof are shown in Tables 3 and 4.

The coin cells manufactured according to Manufacture Examples 1 to 17 and Comparative Manufacture Examples 1 to 3 were subjected to the cycle of charging and discharging once at 0.1 C (a formation process). Then, the coin cells were subjected to the cycle of charging and discharging once at 0.2 C, and initial charge and discharge characteristics of the coin cells were measured. Separately, the coin cells were subjected to the cycle of charging and discharging 100 times at 1 C and cycle characteristics thereof were measured. During charging, a constant current (CC) mode was executed, and then, a constant voltage (CV) mode was executed, and then, cut-off was performed at 0.01 C; and during discharging, cut-off was performed at 1.5 V in a constant current (CC) mode.

Initial Charge and Discharge Efficiency

Initial charge and discharge efficiency were calculated according to Equation 1.

$$\text{Initial charge and discharge efficiency (\%)} = (1^{st} \text{ cycle discharge capacity} / 1^{st} \text{ cycle charge capacity}) \times 100 \quad \text{[Equation 1]}$$

(2) Initial Discharge Capacity and 100-Cycle Post Discharge Capacity

A discharge capacity after a 1$^{st}$ charge and a discharge capacity after 100 cycles were measured.

(3) Capacity Retention Ratio

A capacity retention ratio was measured according to Equation 2.

$$\text{Capacity retention ratio (\%)} = (100^{st} \text{ cycle discharge capacity} / 1^{st} \text{ cycle discharge capacity}) \times 100 \quad \text{[Equation 2]}$$

TABLE 3

|  | Initial discharge capacity (mAh/g) | Initial charge and discharge efficiency (%) | Discharge capacity after 100 cycles (mAh/g) | Capacity retention ratio after 100 cycles (%) | Change in discharge capacity after 100 cycles compared to Comparative Manufacture Example 1 (%) | Change in capacity retention ratio after 100 cycles compared to Comparative Manufacture Example 1 (%) | Change in discharge capacity after 100 cycles compared to Comparative Manufacture Example 2 (%) | Change in capacity retention ratio after 100 cycles compared to Comparative Manufacture Example 2 (%) |
|---|---|---|---|---|---|---|---|---|
| Manufacture Example 1 | 1327.04 | 89.82 | 1064.06 | 85.93 | 128.82 | 100.74 | 141.45 | 102.86 |
| Manufacture Example 2 | 1261.52 | 89.54 | 1005 | 85.6 | 121.67 | 100.35 | 133.60 | 102.47 |
| Manufacture Example 3 | 1200.68 | 89.32 | 950.93 | 85.35 | 115.12 | 100.06 | 126.41 | 102.17 |
| Manufacture Example 4 | 1247.42 | 89.77 | 1006.08 | 86.18 | 121.80 | 101.03 | 133.75 | 103.16 |

TABLE 3-continued

|  | Initial discharge capacity (mAh/g) | Initial charge and discharge efficiency (%) | Discharge capacity after 100 cycles (mAh/g) | Capacity retention ratio after 100 cycles (%) | Change in discharge capacity after 100 cycles compared to Comparative Manufacture Example 1 (%) | Change in capacity retention ratio after 100 cycles compared to Comparative Manufacture Example 1 (%) | Change in discharge capacity after 100 cycles compared to Comparative Manufacture Example 2 (%) | Change in capacity retention ratio after 100 cycles compared to Comparative Manufacture Example 2 (%) |
|---|---|---|---|---|---|---|---|---|
| Manufacture Example 5 | 1185.83 | 89.49 | 950.03 | 85.91 | 115.02 | 100.72 | 126.29 | 102.84 |
| Manufacture Example 6 | 1128.64 | 89.27 | 898.7 | 85.7 | 108.80 | 100.47 | 119.47 | 102.59 |
| Manufacture Example 7 | 1172.57 | 89.68 | 955.71 | 87.47 | 115.70 | 102.54 | 127.05 | 104.71 |
| Manufacture Example 8 | 1114.68 | 89.4 | 902.24 | 87.2 | 109.23 | 102.23 | 119.94 | 104.38 |
| Manufacture Example 9 | 1060.92 | 89.18 | 853.27 | 86.99 | 103.30 | 101.98 | 113.43 | 104.13 |
| Manufacture Example 10 | 1102.22 | 89.59 | 910.26 | 89.05 | 110.20 | 104.40 | 121.01 | 106.60 |
| Manufacture Example 11 | 1047.8 | 89.31 | 859.11 | 88.77 | 104.01 | 104.07 | 114.21 | 106.26 |
| Manufacture Example 12 | 997.27 | 89.1 | 812.26 | 88.55 | — | 103.81 | 107.98 | 106.00 |
| Manufacture Example 13 | 1036.09 | 89.41 | 868.4 | 90.83 | 105.13 | 106.48 | 115.44 | 108.73 |
| Manufacture Example 14 | 984.93 | 89.13 | 819.37 | 90.54 | — | 106.14 | 108.92 | 108.38 |
| Manufacture Example 15 | 937.43 | 88.92 | 774.46 | 90.32 | — | 105.89 | 102.95 | 108.12 |

TABLE 4

|  | Initial discharge capacity (mAh/g) | Initial charge and discharge efficiency (%) | Discharge capacity after 100 cycles (mAh/g) | Capacity retention ratio after 100 cycles (%) | Change in capacity retention ratio after 100 cycles compared to Comparative Manufacture Example 1 (%) | Change in discharge capacity after 100 cycles compared to Comparative Manufacture Example 2 (%) | Change in capacity retention ratio after 100 cycles compared to Comparative Manufacture Example 2 (%) |
|---|---|---|---|---|---|---|---|
| Manufacture Example 16 | 1060.06 | 89.52 | 866.72 | 88.44 | 101.5% | 104.9% | 103.7% |
| Manufacture Example 17 | 1047.49 | 89.50 | 866.87 | 89.60 | 102.9% | 104.9% | 105.0% |
| Manufacture Example 13 | 1036.09 | 89.41 | 868.42 | 90.83 | 104.3% | 105.1% | 106.5% |

TABLE 5

|  |  | Initial discharge capacity (mAh/g) | Initial charge and discharge efficiency (%) | Discharge capacity after 100 cycles (mAh/g) | Capacity retention ratio after 100 cycles (%) |
|---|---|---|---|---|---|
| Comparative Example 1 | Manufacture | 1027 | 85.4 | 826 | 85.3 |
| Comparative Example 2 | Manufacture | 960 | 83.7 | 752 | 83.5 |
| Comparative Example 3 | Manufacture | 1500 | 86.5 | 1200 | 82 |

Referring to Tables 3 and 4, it was confirmed that the lithium secondary batteries of Manufacture Examples 1 to 17 had a higher capacity retention ratio than the lithium secondary batteries of Comparative Manufacture Examples 1 and 2.

Figure 2:
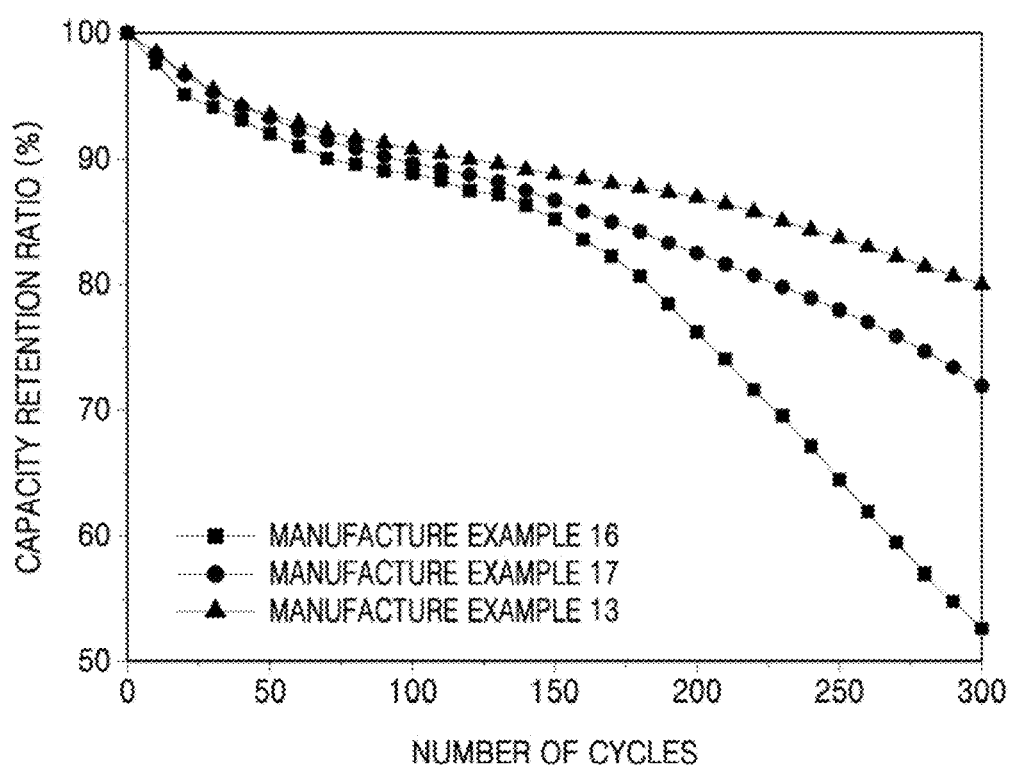
FIG. 2 illustrates a graph showing the capacity retention ratio of lithium secondary batteries manufactured according to Manufacture Example 13, Manufacture Example 16, and Manufacture Example 17.

The capacity retention ratios of the lithium secondary batteries manufactured according to Manufacture Examples 13, 16, and 17 are shown in FIG. 2.

Referring to FIG. 2, it is shown that when a graphite composite content is increased in an active material including a silicon single phase and a silicon-metal alloy phase at a content ratio of 1:1, when the graphite composite content exceeds a certain level, a reaction area with an electrolytic solution is substantially decreased so as to exhibit greater SEI formation suppression effects and electrode lifespan improvement effects.

Figure 3:
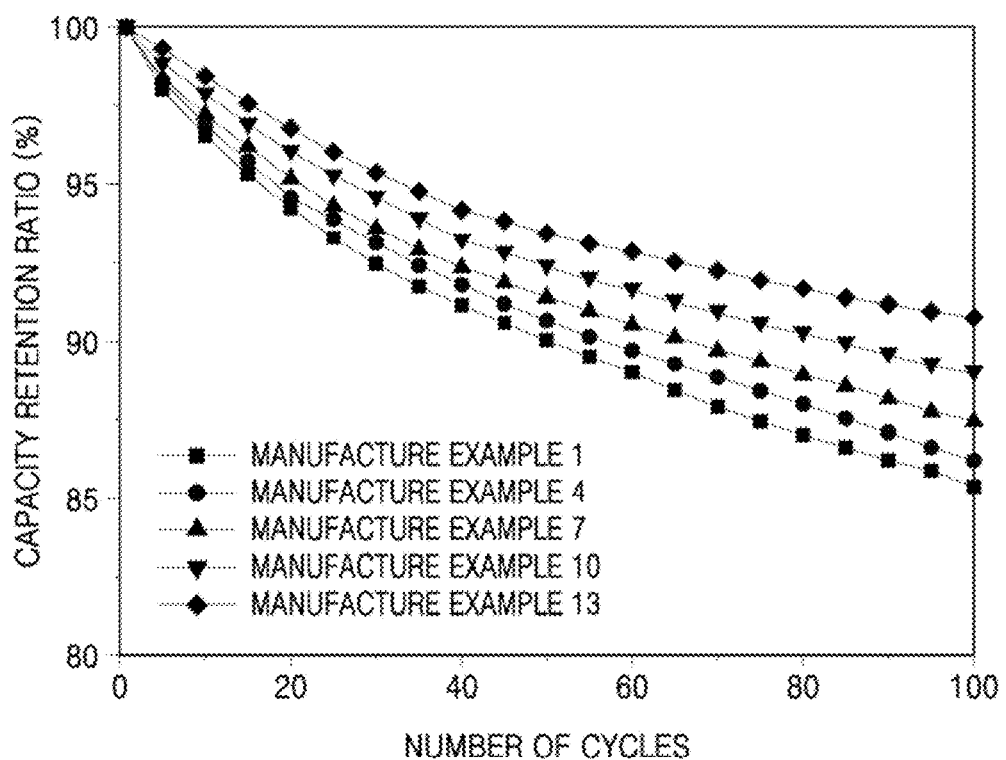
FIG. 3 illustrates a graph showing the capacity retention ratio of lithium secondary batteries manufactured according to Manufacture Example 1, Manufacture Example 4, Manufacture Example 7, Manufacture Example 10, and Manufacture Example 13.

The capacity retention ratios of the lithium secondary batteries manufactured according to Manufacture Examples 1, 4, 7, 10, and 13 are shown in FIG. 3. Initial efficiency and capacity characteristics of the lithium secondary batteries manufactured according to Comparative Manufacture Examples 1 and 2, and Manufacture Examples 7, 10, and 13, were measured. Results thereof are shown in FIG. 4.

Figure 4:
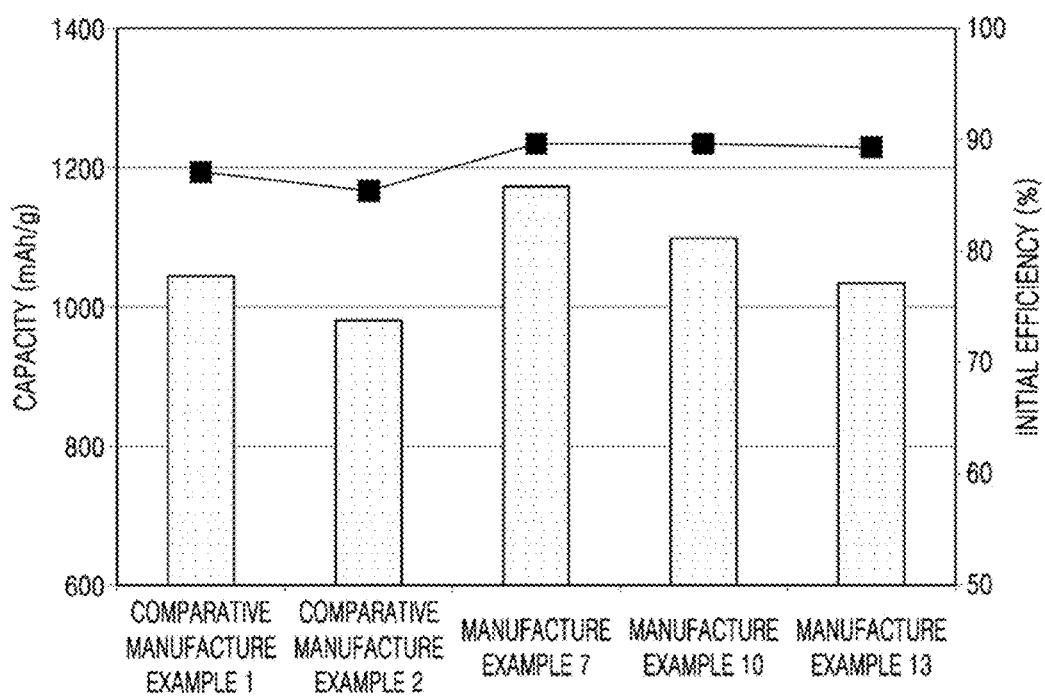
FIG. 4 illustrates a graph showing the initial efficiency and capacity retention ratio of lithium secondary batteries manufactured according to Comparative Manufacture Example 1, Comparative Manufacture Example 2. Manufacture Example 7, Manufacture Example 10, and Manufacture Example 13.

Referring to FIGS. 3 and 4, it is shown that when an active material including a silicon single phase and silicon-metal alloy phase at different ratios are formed as a composite together with the same amount of graphite, the initial capacity varied depending on the silicon content. Within a certain silicon content range, capacity was maintained.

Evaluation Example 2: Transmission Electron Microscopy

A cross-section of the negative electrode active material prepared according to Example 7 was pre-treated with a focused ion beam (FIB), and the prepared sample was identified by transmission electron microscopy (TEM). The obtained TEM images thereof are shown in FIGS. 5 and 6.

Figure 5:
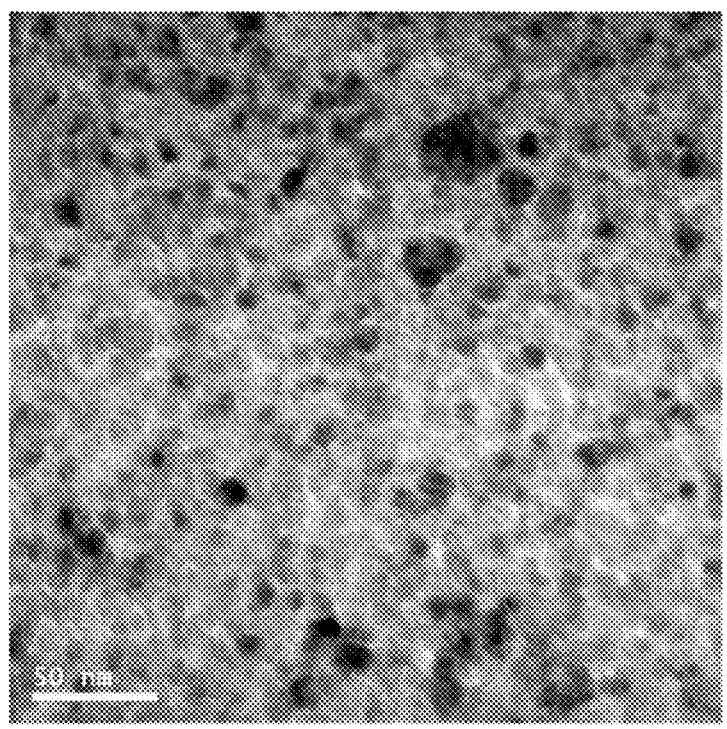
FIGS. 5 and 6 illustrate images showing a cross-section of a negative electrode active material prepared according to Example 7.
Figure 6:
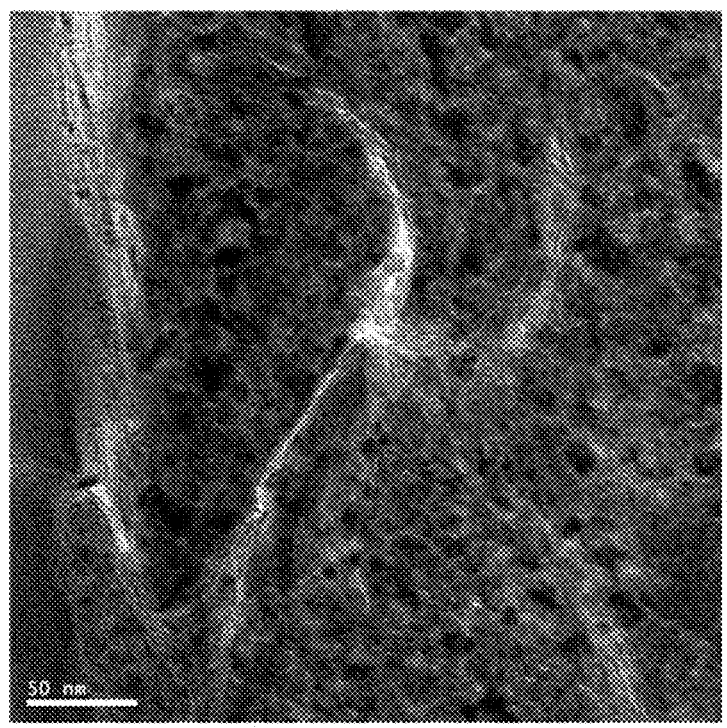

Referring to FIGS. 5 and 6, it is shown that the granular size of the negative electrode active material was about 50 nm or less and that a composite graphite layer was formed.

By way of summation and review, an electrode active material, such as silicon (Si), tin (Sn), antimony (Sb), aluminum (Al), or the like, capable of forming an electrochemical alloy with a lithium ion, is actively being researched for commercial use as a negative electrode active material having high capacity.

However, silicon, tin, antimony, and aluminum expand or shrink in volume during charging/discharging when they form an electrochemical alloy with lithium. The charging- and discharging-caused volumetric changes may cause deterioration in cycle characteristics of an electrode including silicon, tin, antimony, or aluminum as an active material. The volumetric changes may lead to cracks in the surface of particles of an electrode active material, thereby creating fine breaks in the surface of the electrode. Such defects may be another factor influencing the deterioration of cycle characteristics of a lithium secondary battery including the negative electrode. Furthermore, when silicon volumetrically expands, a solid electrolyte interface (SEI) film may be continuously formed. The formation of the SEI film may result in a decrease in initial efficiency and a rapid decrease in a capacity retention rate (C.R.R) of a lithium secondary battery including an electrode, and thus, the lifespan of the lithium secondary battery may be reduced.

Accordingly, provided is a negative electrode active material of which a volumetric change is suppressed during charging and discharging by controlling the composition of a silicon-containing alloy.

In a negative electrode active material according to an embodiment, a resistance of a silicon single phase to expansion stress is increased, and a silicon-non metallic composite phase and a non-metallic single phase are arranged inside and outside particles of the negative electrode active material, thereby preventing expansion-induced particle uniformity and excessive formation of an SEI film. The negative electrode active material may enable manufacture of a lithium secondary battery with improved lifespan characteristics.

One or more embodiments include a negative electrode active material for a lithium secondary battery, the negative electrode active material having fewer cracks that occurs due to volumetric change.

One or more embodiments include a lithium secondary battery that has improved lifespan characteristics due to a negative electrode including the negative electrode active material therein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A negative electrode active material for a lithium secondary battery, the negative electrode active material comprising:
   silicon (Si);
   manganese (Mn);
   Component A including at least one selected from iron (Fe), molybdenum (Mo), chromium (Cr), zinc (Zn), titanium (Ti), nickel (Ni), vanadium (V), tungsten (W), and yttrium (Y); and
   Component B including at least one selected from carbon (C), boron (B), oxygen (O), nitrogen (N), phosphorous (P), and sulfur (S),
   wherein a total amount of Si, Mn, and Component A is about 70 atom % or less,
   an amount of Component B is 30 atom % or more, and
   a total amount of Mn and Component A is in a range of about 10 atom % to about 35 atom %, and an amount of Si is in a range of about 35 atom % to about 56 atom %.

2. The negative electrode active material as claimed as claim 1, wherein an atomic ratio of Mn to Component A as mixed is in a range of 1:9 to 9:1.

3. The negative electrode active material as claimed as claim 1, wherein Component A is Fe.

4. The negative electrode active material as claimed in claim 1, wherein the negative active material is represented by the formula Si-M-carbon (C), in which M includes manganese (Mn) and at least one selected from iron (Fe), molybdenum (Mo), chromium (Cr), zinc (Zn), titanium (Ti), and nickel (Ni).

5. The negative electrode active material as claimed as claim 4, wherein,
   in the negative electrode active material represented by the formula Si-M-carbon (C), an amount of M is in a range of about 10 atom % to about 35 atom %, and an amount of carbon is in a range of about 30 atom % to about 46 atom %.

6. The negative electrode active material as claimed as claim 4, wherein,
   in the negative electrode active material represented by the formula Si-M-carbon (C), M includes manganese (Mn) and a metal ($M_1$) including at least one selected from iron (Fe), molybdenum (Mo), chromium (Cr), zinc (Zn), titanium (Ti), and nickel (Ni).

7. The negative electrode active material as claimed as claim 6, wherein
   an atomic ratio of manganese to metal ($M_1$) as mixed in M is in a range of 1:9 to 9:1.

8. The negative electrode active material as claimed as claim 6, wherein, in the negative electrode active material represented by the formula Si-M-carbon (C), an amount of manganese is in a range of about 1.2 atom % to about 31.5 atom % based on a total amount of Si-M-carbon (C), and an amount of metal ($M_1$) is in a range of about 1.2 atom % to about 31.5 atom % based on the total amount of Si-M-carbon (C).

9. A negative electrode active material including at least one selected from: $Si_{49.2}Mn_{5.4}Fe_{5.4}C_{40}$, $Si_{49.2}Mn_{9.7}Mo_{1.1}C_{40}$, $Si_{49.2}Mn_{1.1}Mo_{9.7}C_{40}$, $Si_{49.2}Mn_{5.4}Cr_{5.4}C_{40}$, $Si_{49.2}Mn_{9.7}Zn_{1.1}C_{40}$, $Si_{49.2}Mn_{1.1}Zn_{9.7}C_{40}$, $Si_{49.2}Mn_{5.4}Ti_{5.4}C_{40}$, $Si_{49.2}Mn_{9.7}Ni_{1.1}C_{40}$, $Si_{49.2}Mn_{1.1}Ni_{9.7}C_{40}$, $Si_{48.6}Mn_{5.7}Fe_{5.7}C_{40}$, $Si_{48.6}Mn_{10.3}Mo_{1.1}C_{40}$, $Si_{48.6}Mn_{1.1}Mo_{10.3}C_{40}$, $Si_{48.6}Mn_{5.7}Cr_{5.7}C_{40}$, $Si_{48.6}Mn_{10.3}Zn_{1.1}C_{40}$, $Si_{48.6}Mn_{1.1}Zn_{10.3}C_{40}$, $Si_{48.6}Mn_{5.7}Ti_{5.7}C_{40}$, $Si_{48.6}Mn_{10.3}Ni_{1.1}C_{40}$, $Si_{48.6}Mn_{1.1}Ni_{10.3}C_{40}$, $Si_{48.0}Mn_{6.6}Fe_{6.0}C_{40}$, $Si_{48.0}Mn_{10.8}Mo_{1.2}C_{40}$, $Si_{48.0}Mn_{1.2}Mo_{10.8}C_{40}$, $Si_{48.0}Mn_{6.6}Cr_{6.0}C_{40}$, $Si_{48.0}Mn_{10.8}Zn_{1.2}C_{40}$, $Si_{48.0}Mn_{1.2}Zn_{10.8}C_{40}$, $Si_{48.0}Mn_{6.6}Ti_{6.0}C_{40}$, $Si_{48.0}Mn_{10.8}Ni_{1.2}C_{40}$, $Si_{48.0}Mn_{1.2}Ni_{10.8}C_{40}$, $Si_{47.4}Mn_{6.3}Fe_{6.3}C_{40}$, $Si_{47.4}Mn_{11.3}Mo_{1.3}C_{40}$, $Si_{47.4}Mn_{1.3}Mo_{11.3}C_{40}$, $Si_{47.4}Mn_{6.3}Cr_{6.3}C_{40}$, $Si_{47.4}Mn_{11.3}Zn_{1.3}C_{40}$, $Si_{47.4}Mn_{1.3}Zn_{11.3}C_{40}$, $Si_{47.4}Mn_{6.3}Ti_{6.3}C_{40}$, $Si_{47.4}Mn_{11.3}Ni_{1.3}C_{40}$, $Si_{47.4}Mn_{1.3}Ni_{11.3}C_{40}$, $Si_{46.8}Mn_{6.6}Fe_{6.6}C_{40}$, $Si_{46.8}Mn_{11.9}Mo_{1.3}C_{40}$, $Si_{46.8}Mn_{1.3}Mo_{11.9}C_{40}$, $Si_{46.8}Mn_{6.6}Cr_{6.6}C_{40}$, $Si_{46.8}Mn_{11.9}Zn_{1.3}C_{40}$, $Si_{46.8}Mn_{1.3}Zn_{11.9}C_{40}$, $Si_{46.8}Mn_{6.6}Ti_{6.6}C_{40}$, $Si_{46.8}Mn_{11.9}Ni_{1.3}C_{40}$, $Si_{46.8}Mn_{1.3}Ni_{11.9}C_{40}$, $Si_{46.2}Mn_{6.9}Fe_{6.9}C_{40}$, $Si_{46.2}Mn_{12.4}Mo_{1.4}C_{40}$, $Si_{46.2}Mn_{1.4}Mo_{12.4}C_{40}$, $Si_{46.2}Mn_{6.9}Cr_{6.9}C_{40}$, $Si_{46.2}Mn_{12.4}Zn_{1.4}C_{40}$, $Si_{46.2}Mn_{0.4}Zn_{12.4}C_{40}$, $Si_{46.2}Mn_{6.9}Ti_{6.9}C_{40}$, $Si_{46.2}Mn_{12.4}Ni_{1.4}C_{40}$, $Si_{46.2}Mn_{1.4}Ni_{12.4}C_{40}$, $Si_{50.7}Mn_{12.9}Fe_{1.4}C_{40}$, $Si_{33.0}Mn_{24.3}Fe_{2.7}C_{40}$, $Si_{46.8}Mn_{11.9}Fe_{1.3}C_{40}$, $Si_{47.4}Mn_{1.3}Fe_{11.3}C_{40}$, $Si_{47.4}Mn_{6.3}Mo_{6.3}C_{40}$, $Si_{47.4}Mn_{11.3}Cr_{1.3}C_{40}$, $Si_{47.4}Mn_{1.3}Cr_{11.3}C_{40}$, $Si_{47.4}Mn_{6.3}Zn_{6.3}C_{40}$, $Si_{47.4}Mn_{11.3}Ti_{1.3}C_{40}$, $Si_{47.4}Mn_{1.3}Ti_{11.3}C_{40}$, $Si_{47.4}Mn_{6.3}Ni_{6.3}C_{40}$, $Si_{46.8}Mn_{11.9}Fe_{1.3}C_{40}$, $Si_{46.8}Mn_{1.3}Fe_{11.9}C_{40}$, $Si_{46.8}Mn_{6.6}Mo_{6.6}C_{40}$, $Si_{46.8}Mn_{11.9}Cr_{1.3}C_{40}$, $Si_{46.8}Mn_{1.3}Cr_{11.9}C_{40}$, $Si_{46.8}Mn_{6.6}Zn_{6.6}C_{40}$, $Si_{46.8}Mn_{11.9}Ti_{1.3}C_{40}$, $Si_{46.8}Mn_{0.3}Ti_{11.9}C_{40}$, $Si_{46.8}Mn_{6.6}Ni_{6.6}C_{40}$, $Si_{46.2}Mn_{12.4}Fe_{0.4}C_{40}$, $Si_{46.2}Mn_{0.4}Fe_{12.4}C_{40}$, $Si_{46.2}Mn_{6.9}Mo_{6.9}C_{40}$, $Si_{46.2}Mn_{12.4}Cr_{1.4}C_{40}$, $Si_{46.2}Mn_{0.4}Cr_{12.4}C_{40}$, $Si_{46.2}Mn_{6.9}Zn_{6.9}C_{40}$, $Si_{46.2}Mn_{12.4}Ti_{1.4}C_{40}$, $Si_{46.2}Mn_{1.4}Ti_{12.4}C_{40}$, $Si_{46.2}Mn_{6.9}Ni_{6.9}C_{40}$, $Si_{54.6}Mn_{13.9}Fe_{1.5}C_{40}$, $Si_{46.8}Mn_{11.9}Fe_{1.3}C_{40}$, $Si_{35.0}Mn_{22.5}Fe_{2.5}C_{40}$, and $Si_{56.0}Mn_{3.6}Fe_{0.4}C_{40}$.

10. The negative electrode active material as claimed as claim 1, wherein an average crystal grain size of the negative electrode active material is in a range of about 0.5 nm to about 50 nm, and an average particle size of the negative electrode active material is in a range of about 0.5 μm to about 10 μm.

11. A lithium secondary battery comprising a negative electrode that includes the negative electrode active material as claimed as claim 1.

* * * * *